United States Patent
Vogedes et al.

(10) Patent No.: US 9,338,290 B2
(45) Date of Patent: *May 10, 2016

(54) METHOD AND APPARATUS FOR FACILITATING A COMMUNICATION SESSION

(71) Applicant: Motorola Mobility LLC, Libertyville, IL (US)

(72) Inventors: Jerome O. Vogedes, Milwaukee, WI (US); Dean E. Thorson, Grayslake, IL (US); Mark Lemke, Mundelien, IL (US)

(73) Assignee: Google Technology Holdings LLC, Mountain View, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 14/456,657

(22) Filed: Aug. 11, 2014

(65) Prior Publication Data
US 2014/0349621 A1 Nov. 27, 2014

Related U.S. Application Data

(63) Continuation of application No. 13/598,836, filed on Aug. 30, 2012, now Pat. No. 8,805,335.

(51) Int. Cl.
| | | |
|---|---|---|
| *H04M 11/10* | (2006.01) |
| *H04M 3/42* | (2006.01) |
| *H04L 29/06* | (2006.01) |
| *H04M 3/428* | (2006.01) |
| *H04M 3/533* | (2006.01) |

(52) U.S. Cl.
CPC ....... *H04M 3/42221* (2013.01); *H04L 65/1006* (2013.01); *H04L 65/1069* (2013.01); *H04L 65/1083* (2013.01); *H04L 65/1096* (2013.01); *H04M 3/4288* (2013.01); *H04M 3/533* (2013.01); *H04M 3/42017* (2013.01); *H04M 2201/14* (2013.01); *H04M 2207/185* (2013.01)

(58) Field of Classification Search
CPC .......... H04M 3/42221; H04M 3/4228; H04M 3/533; H04M 3/42017; H04M 2201/14; H04M 2207/185; H04L 65/1006; H04L 65/1069; H04L 65/1083; H04L 65/1096
USPC .................. 455/413, 412.1, 414.1; 379/88.22–88.28, 88.04, 88.12
See application file for complete search history.

(56) References Cited

U.S. PATENT DOCUMENTS

| | | | | |
|---|---|---|---|---|
| 5,960,064 | A | * | 9/1999 | Foladare ................. H04M 3/20 379/211.01 |
| 6,031,896 | A | | 2/2000 | Gardell et al. |
| 6,661,886 | B1 | * | 12/2003 | Huart ...................... H04M 1/65 379/207.01 |
| 7,035,385 | B2 | | 4/2006 | Levine et al. |
| 7,769,146 | B1 | | 8/2010 | Weaver et al. |
| 7,783,283 | B2 | | 8/2010 | Kuusinen et al. |
| 8,218,743 | B2 | | 7/2012 | Hanson et al. |
| 8,233,607 | B1 | | 7/2012 | Ambrose et al. |
| 8,417,224 | B1 | | 4/2013 | Young |

(Continued)

*Primary Examiner* — Mong-Thuy Tran
(74) *Attorney, Agent, or Firm* — Shumaker & Sieffert, P.A.

(57) ABSTRACT

When a first user is leaving a voicemail while a second user is attempting to call the first user back, the first user is given the option to ignore the second caller, delete the voicemail and connect with the second user, or hold while the second user reviews the voicemail. The voicemail may or may not be complete. This may avoid the need for the first user to repeat the information contained in the voicemail. In one embodiment, the voicemail message is played on the second user's device as a ring-back tone.

15 Claims, 4 Drawing Sheets

(56) References Cited

U.S. PATENT DOCUMENTS

| | | | | |
|---|---|---|---|---|
| 8,472,604 B2* | 6/2013 | Brahm | ............... | H04M 3/4281 379/142.08 |
| 8,805,335 B2* | 8/2014 | Vogedes | ............... | H04M 3/4288 379/88.12 |
| 9,001,981 B2* | 4/2015 | Burckart | ............... | H04M 3/4288 379/67.1 |
| 2005/0201534 A1* | 9/2005 | Ignatin | ............... | H04M 1/663 379/88.22 |
| 2006/0264205 A1 | 11/2006 | Gibbs | | |
| 2007/0116227 A1* | 5/2007 | Vitenson | ............... | H04M 3/4878 379/207.02 |
| 2007/0274488 A1 | 11/2007 | Callaghan | | |
| 2007/0280457 A1 | 12/2007 | Aberethy et al. | | |
| 2007/0280458 A1 | 12/2007 | Aberethy et al. | | |
| 2008/0037735 A1* | 2/2008 | Lee | ............... | H04M 3/533 379/88.22 |
| 2008/0101559 A1 | 5/2008 | Bartfeld et al. | | |
| 2009/0245486 A1 | 10/2009 | Lingafelt et al. | | |
| 2011/0194678 A1 | 8/2011 | Lewis et al. | | |
| 2012/0163566 A1 | 6/2012 | Gravino et al. | | |

* cited by examiner

METHOD AND APPARATUS FOR FACILITATING A COMMUNICATION SESSION

RELATED APPLICATION

This application is a continuation of U.S. application Ser. No. 13/598,836, filed Aug. 30, 2012, the entire content of which is incorporated herein by reference.

TECHNICAL FIELD

The present disclosure relates generally to communication, and more particularly to a method and system for initiating a communication session.

BACKGROUND

A very common call scenario is as follows: A first user calls a second user, the second user does not answer, and the first user gets routed to the second user's voicemail. However, while the first user is leaving the voicemail, the second user sees that there is a missed call, and tries to call the first user back. The first user then may need to repeat the information that was in the voicemail, as it is likely that the content of the voicemail relates to the purpose of the call.

BRIEF DESCRIPTION OF THE DRAWINGS

The various aspects, features and advantages of the invention will become more fully apparent in the following description with the accompanying drawings described below. The drawings may have been simplified for clarity and are not necessarily drawn to scale.

DESCRIPTION

In accordance with the foregoing, a method and apparatus for facilitating a communication session will now be described. An embodiment of the invention detects the occurrence of a voicemail callback collision; that is, when a first user leaves a voicemail for a second user at the same time the second user is returning the first user's call. When such a collision is detected, the first user is given the option to ignore the second caller, delete the voicemail and connect with the second user, or hold while the second user reviews the voicemail. The voicemail may or may not be complete, but the second user is given the ability to listen to the voicemail, however incomplete, prior to being connected to the first user. This may avoid the need for the first user to repeat the information contained in the voicemail. In one embodiment, the voicemail message is played on the second user's device as a ring-back tone.

Some embodiments of the invention may be implemented in a Long-Term Evolution (LTE) network, with a Session Initiation Protocol (SIP) proxy facilitating the communication between first and second user equipment devices (UEs), which are being used by the first and second users. Once a communication session has been established, the first and second UEs may communicate directly with one another (using a protocol such as Real Time Protocol (RTP)) without the need for the SIP proxy.

The embodiments disclosed herein are frequently described in the context of an LTE cellular system. It is to be understood, however, that the scope of the invention is not limited to LTE and may be implemented in other types of wireless networks (IEEE 802.11, 802.16, etc.).

Figure 1:
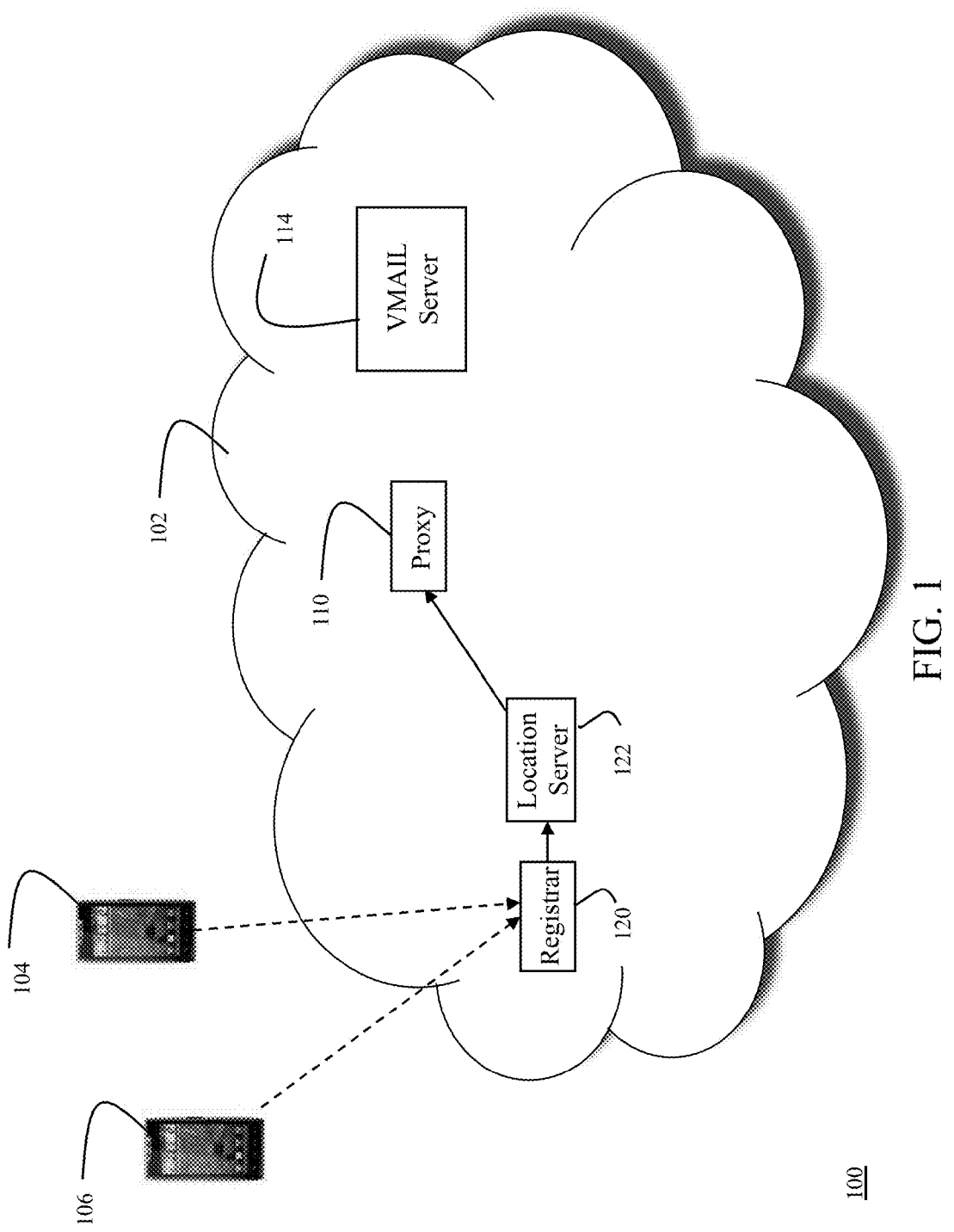
FIG. 1 depicts an example of a communication system in which various embodiments of the invention may be implemented.

An example of a network in which an embodiment of the invention operates will now be described. FIG. 1 illustrates a communication system 100, which includes a network 102. The network 102 may include many components such as wireless access points, cellular base stations, wired networks (fiber optic, coaxial cable, etc.) Any number of communication devices and many varieties of communication devices may exchange data (voice, video, web pages, etc.) via the network 102 (cell phones, laptops, tablet computers, machine-to-machine devices, etc.) The term User Equipment (UE) as used herein may be any such device.

Referring still to FIG. 1, a first UE 104 and a second UE 106 communicate via the network 102. It is understood that these UEs are representative, and that there may be many other UEs. The communication network 102 includes a proxy 110. According to an embodiment of the invention, the proxy 110 operates to facilitate the initiation of packet-based calls among various UEs in the network 102. Once such calls are initiated, the UEs may communicate among one another directly using a real-time communication technique. In one embodiment, the proxy 110 is a session initiation protocol (SIP) proxy, and facilitates the initiation of calls between UEs using SIP signaling according to the SIP protocol. Once calls have been setup, the UEs communicate with one another using the Real-Time Protocol (RTP).

The communication network 102 further includes a voicemail (VMAIL) server 114, a registrar 120, and a location service 122. In an embodiment of the invention, the UEs 104 and 106 register their user names and location information (e.g., network addresses or phone numbers) with the registrar 120 (for example, when initially accessing the network 102). The registrar 120 provides the user names and location information to the location server 122, which associates the user names with their respective location information. When the proxy 110 receives a message (such as a SIP message) from a first UE that is intended for a second UE, the message will typically identify the second UE by its user name. The proxy 110 provides the user name to the location server 122, which responds with the current location information for the second UE. Using the obtained location information, the proxy 110 forwards the message to the second UE. The proxy 110 may modify the message prior to sending it to the second UE. Examples, of such messages will be described in greater detail below.

Figure 2:
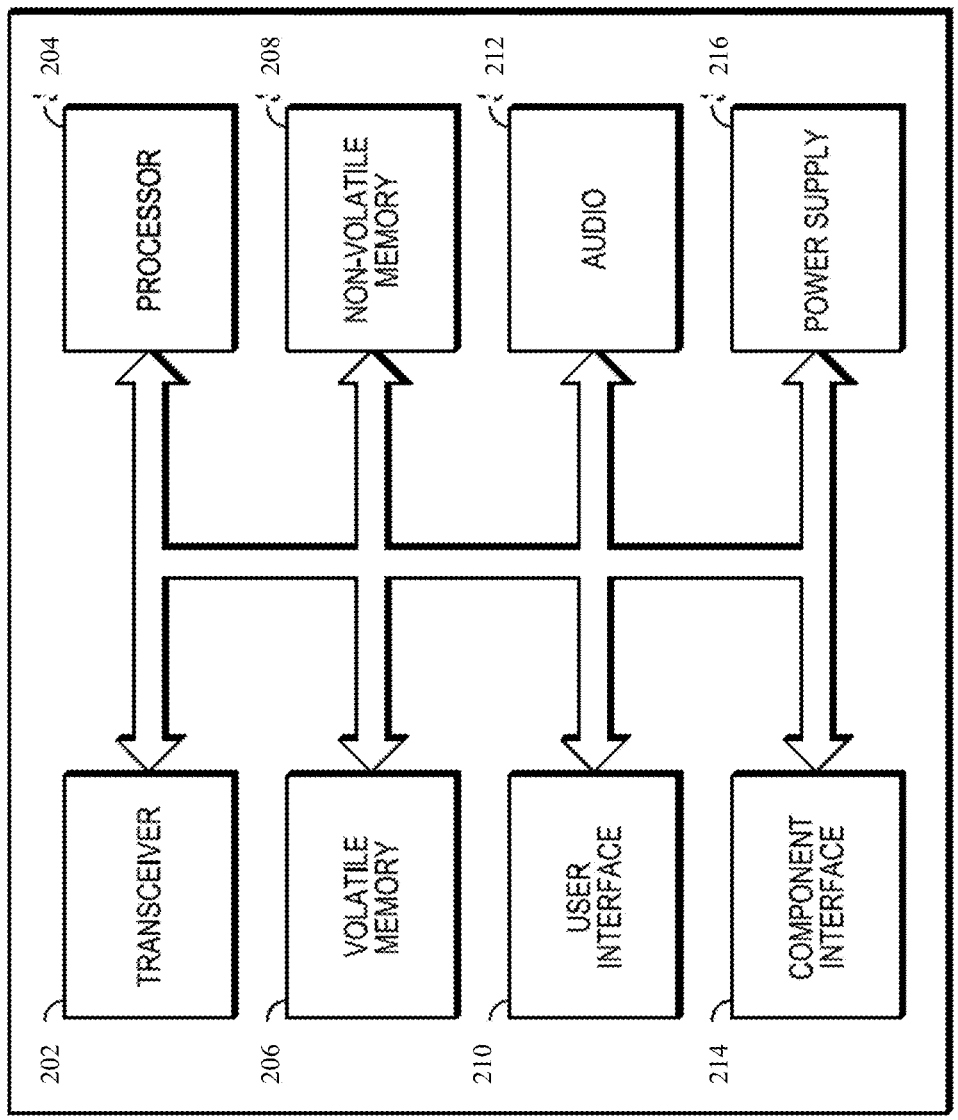
FIG. 2 shows a block diagram depicting aspects of a device that that may function as a user equipment (UE) in an embodiment of the invention.

FIG. 2 illustrates an embodiment of a telecommunication apparatus or electronic device that may act as a UE (such as one or more of the UEs depicted in FIG. 1). The UE may be capable of accessing the information or data stored in the network 102. For some embodiments of the disclosure, the UE may also support one or more applications for communicating with the network 102.

The UE may include a transceiver 202, which is capable of sending and receiving data over the network 102. The UE may include a processor 204 that executes stored programs (such as an RTP or SIP user agent). The UE may also include a volatile memory 206 and a non-volatile memory 208 which are used by the processor 204. The UE may include a user input interface 210 that may comprise elements such as a keypad, display, touch screen, and the like. The UE may also include a user output device that may comprise a display screen and an audio interface 212 that may comprise elements such as a microphone, earphone, and speaker. The UE also may include a component interface 214 to which additional elements may be attached, for example, a universal serial bus (USB) interface. Finally, the UE may include a power supply 216.

The proxy 110 (FIG. 1) may have any or all of the same elements that are described for the UE. For example, the proxy 110 may include a transceiver that can send and receive SIP messages, a processor that can execute a SIP proxy program, and a memory that can store the instruction for carrying out the SIP proxy program. The memory may also store data such as phone numbers or internet protocol (IP) addresses of UEs, with the phone numbers or IP addresses associated with user names of users who communicate using the UEs.

An embodiment of the invention is practiced in an LTE network, through which UEs that communicate with one another using SIP to initiate communication sessions and RTP to carry out such sessions. In one implementation, a call between a first UE and a second UE is set up in generally the following manner. The first UE "invites" the second UE to join in a call by sending a SIP INVITE message. Because the first UE does not have the second UE's location information, the first UE sends the invitation to the second UE via a SIP proxy. The SIP proxy is able to obtain the second UE's location information from location server 122. If the second UE accepts the invitation, the SIP proxy provides the location information of the second UE to the first UE. The first and second UE are then able to engage in a communication session with one another using RTP.

Other types of SIP messages that the first and second UEs 104 and 106 may exchange include ACK, which confirms that the caller has received a final response to an INVITE request; BYE, which terminates a call; and CANCEL, which cancels pending call requests but may not terminate a call that has already been accepted. This list is not exhaustive and is a subset of all possible SIP transactions that may occur between UEs.

An example of a call flow in accordance with an embodiment of the invention will now be described with reference to FIGS. 3A and 3B. In this example, the devices participating in the call flow use SIP to set up a communication session, and RTP to carry out the session. However, it is to be understood that any other suitable protocol could be used.

Figure 3A:
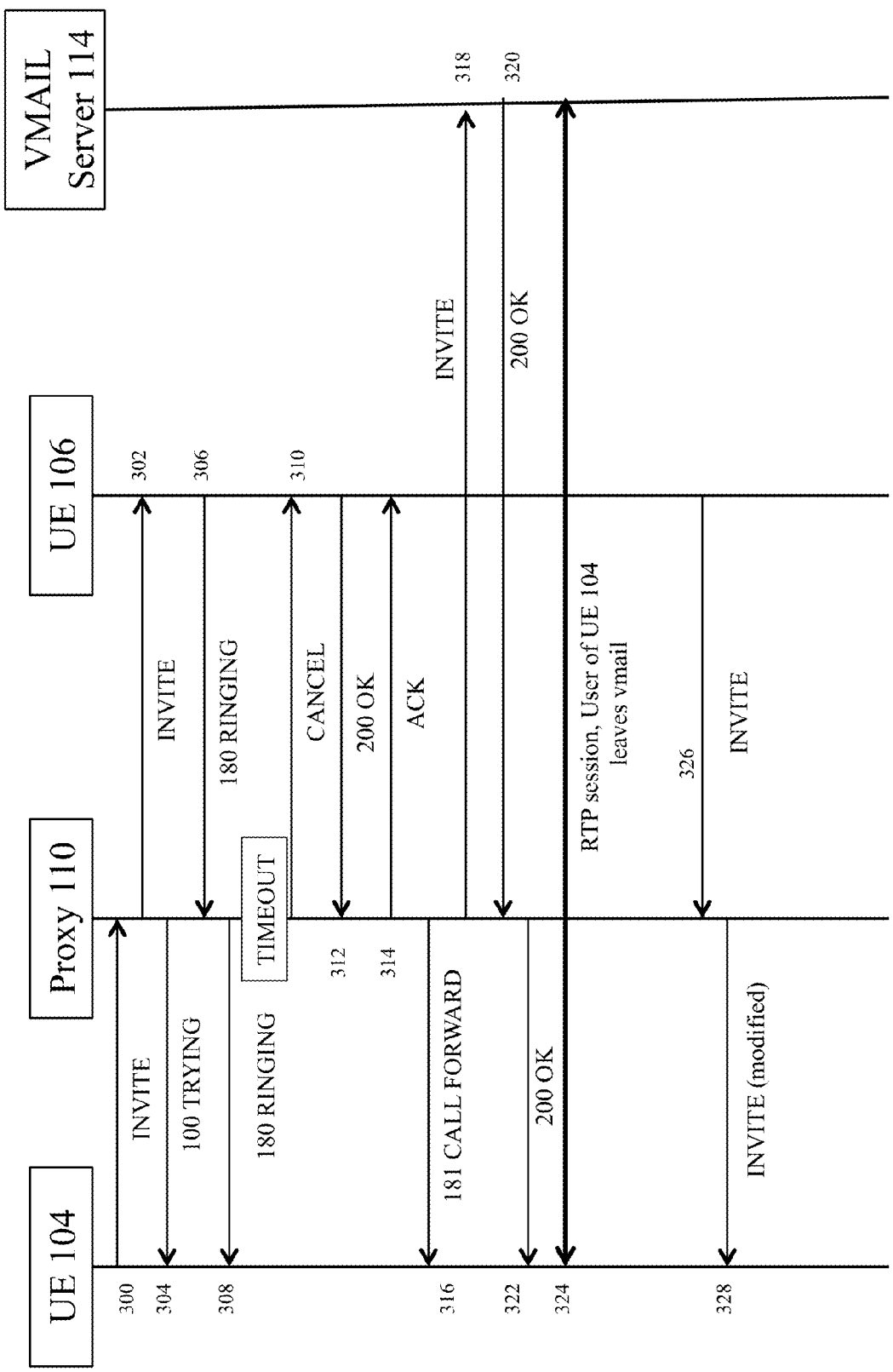
FIGS. 3A and 3B depict a signaling diagram according to an embodiment of the invention.

Turning to FIG. 3A, the first UE 104 sends an INVITE message to the second UE 106 via the proxy 110 at 300. At 302, the proxy 110 looks up the location information of the second UE 106 (using the location server 122) and uses the location information to send the INVITE message to the second UE 106. At 304, the proxy 110 sends a 100 TRYING message to the first UE 104, indicating to the first UE 104 that an attempt to contact the second UE 106 is being made. At 306, the second UE 106 transmits a 180 RINGING message to the proxy 110, indicating that the second UE 106 is ringing. The second UE 106 may also indicate to its user (e.g., on a display of the second UE 106) that the user of the first UE 104 is attempting to contact the user of the second UE 106. At 308, the proxy 110 transmits the 180 RINGING message to the first UE 104. After a predetermined period of time (which may, for example, have been previously set by the first UE 104), the proxy 110 determines that a timeout has occurred, and, at 310 sends a CANCEL message to the second UE 106, thereby cancelling the connection attempt. At 312, the second UE 106 transmits a 200 OK message to the proxy 110, indicating that the connection attempt has been cancelled. At 314, the proxy 110 ACKs the OK message.

At 316, the proxy 110 sends a 181 CALL FORWARD message to the first UE 104, indicating to the first UE 104 that the call of the first UE 104 being forwarded. At 318, the proxy 110 sends an INVITE message to the VMAIL server 114. At 320, the VMAIL server 114 responds with a 200 OK message to the proxy 110. The proxy 110 sends the 200 OK message to the first UE 104 at 322. The OK message may include information that tells the first UE 104 the location of the VMAIL server 114 (e.g., the network address or the phone number of the VMAIL server 114). At 324, the first UE 104 uses the location information received from the proxy 110 to establish an RTP session with the VMAIL server 114. At this point, the first UE 104 communicates directly with the VMAIL server 114 without going through the proxy 110. During the RTP session, the user of the first UE 104 begins leaving a voicemail for the user of the second UE 106 on the VMAIL server 114.

During or shortly after the first UE 104 is leaving the voicemail at 324, the communication network 102 (FIG. 1) may signal the second UE 106 that there is a voicemail for the second UE 106. In some embodiments, the signal may distinguish between a complete and incomplete voicemail (e.g., a voicemail that is in progress). In other embodiments, there may be no indication to the user of the second UE 106 that there is a voicemail being left, especially if the voicemail is not complete (e.g., a user of the first UE 104 is still talking) The user of the second UE 106 attempts to return the call from the user of the first UE 104 while the first UE 106 is engaged in the RTP session with the VMAIL server 114 and while the user of the first UE 104 is in the process of leaving a voicemail. This is shown at 326, at which the second UE 106 sends an INVITE message to the proxy 110. The proxy 110 receives the INVITE message from the second UE 106, determines that the first UE 104 is currently connected to the VMAIL server 114 and, based on that determination, transmits to the first UE 104, a modified INVITE message at 328. The modified INVITE message indicates to the first UE 104 that there is an incoming call from the user for whom the user of the first UE 104 is currently leaving a voicemail.

Figure 3B:
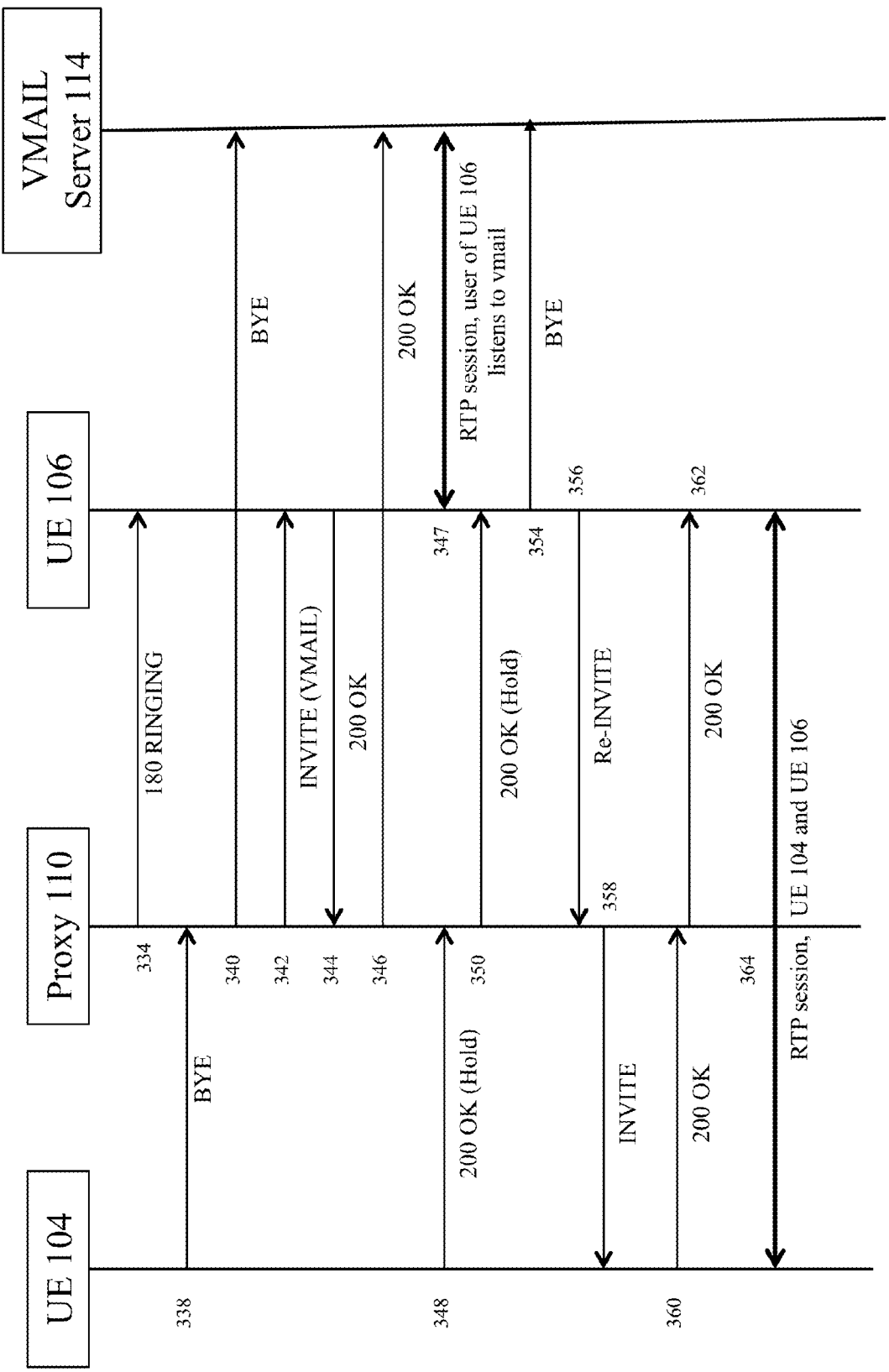

Referring to FIG. 3B, the proxy 110 sends a 180 RINGING message to the second UE 106 at 334. In one embodiment, the 180 RINGING message includes the voicemail (e.g., an unfinished voicemail), which the second UE 106 plays as a customized ring-back tone, e.g. the partial voicemail would play rather than a normal ring-back tone. In one implementation, the proxy 110 creates a connection between the VMAIL server 114 and the second UE 106 when the proxy 110 determines that a voicemail callback collision has occurred. In such a case, the first UE 104 would also be informed of this event, end the partial message and wait until the second UE 106 has finished playing the voicemail.

The first UE 104 may respond to the modified INVITE message (sent at 328 in FIG. 3A) by presenting to its user (e.g., on its display) the option to immediately answer the call, enter a hold mode and wait for the user of the second UE 106 to listen to the voicemail (whether the voicemail is complete or incomplete), or ignore the call. The user of the first UE 104 may also opt to delete the voicemail. For example, the user of the first UE 104 may opt to immediately answer the call and delete the voicemail or to ignore the call and delete the voicemail.

Once the user of the first UE 104 has completed the voicemail or has interrupted the voicemail (e.g., has left only a partial voicemail), the user "hangs up" (by, for example, activating a "hang up" icon on the first UE 104) and the first UE 104 sends a BYE message to the proxy 110, which the proxy 110 sends to the VMAIL server 114 (at 338 and 340).

If the user of the first UE 104 has selected the option to delete the voicemail, the BYE message may indicate this fact to the VMAIL server 114. For example, the proxy 110 may add additional signaling in the BYE message that the VMAIL server 114 responds to by deleting the voicemail. In any event, the BYE message results in the RTP session between the first UE 104 and the VMAIL server 114 to be terminated.

In an embodiment of the invention, if the user of the first UE 104 has opted to ignore the call or to delete the voicemail, steps 342 to 354 of the signaling diagram of FIG. 3B may not occur. Otherwise, at 342, the proxy 110 transmits an INVITE to the second UE 106 to initiate a session between the second UE 106 and the VMAIL server 114. At 344, the second UE 106 transmits and OK to the proxy 110, indicating that the second UE 106 accepts the invitation. The proxy 110 sends the OK message to the VMAIL server 114 at 346. At 347, the second UE 106 and the VMAIL server 114 establish an RTP session with one another. During the session, the second UE 106 accesses its voicemail, thereby allowing the user of the second UE 106 to listen to the user's voicemail—e.g., the full or partial voicemail left by the first UE 104 during the RTP session at 324.

At 348, the first UE 104 sends a 200 OK (Hold) message to the proxy 110, which, indicates that the first UE 104 has accepted the invitation sent by the second UE 106 (at 326 and 328 previously), but that the first UE 104 has put the connection in a hold state. The proxy 110 forwards the OK (Hold) message to the second UE 106 at 350. The second UE 106 reacts to the OK (Hold) message of 350 by sending a BYE message to the VMAIL server 114 at 354, thereby terminating the RTP connection between the second UE 106 and the VMAIL server 114. At this point, the user of the second UE 106 may have finished listening to the voicemail (complete or incomplete) left by a user of the first UE 104. The second UE 106 sends another INVITE message to first UE 104 via the proxy 110 (356 and 358). In response to receiving the INVITE message, the first UE 104 accepts the call from the second UE 106 by sending a 200 OK message to the second UE 106 via the proxy 110 (360 and 362). At 364, the first UE 104 and the second UE 106 establish an RTP session with one another.

It can be seen from the foregoing that a novel and useful method and apparatus for facilitating a call has been described. It is to be noted that embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures.

Embodiments disclosed herein may also be practiced in distributed computing environments where tasks are performed by local and remote processing devices that are linked (either by hardwired links, wireless links, or by a combination thereof) through a communications network.

While the present disclosure and the best modes thereof have been described in a manner establishing possession by the inventors and enabling those of ordinary skill to make and use the same, it will be understood that there are equivalents to the various embodiments disclosed herein and that modifications and variations may be made thereto without departing from the scope and spirit of the disclosure, which are to be limited not by the exemplary embodiments but by the appended claims.

What is claimed is:

1. A method comprising:
   receiving, by a computing device and from a first device, a request to connect with a second device; and
   responsive to determining, by the computing device, that a user of the second device is leaving a voicemail message for a user of the first device at the time the request is received:
      facilitating retrieval of the voicemail message by the first device from a voicemail server on which the voicemail message is being left by at least initiating, by the computing device, a communication session between the first device and the voicemail server, wherein the user of the second device has not completed leaving the voicemail message such that the voicemail message available at the voicemail server is a partial voicemail message;
      receiving, by the computing device and from the voicemail server, an indication that the first device retrieved the partial voicemail message from the voicemail server; and
      responsive to determining, by the computing device and based on the indication, that the first device has retrieved the partial voicemail message, facilitating, by the computing device, initiation of a communication session between the first device and the second device.

2. The method of claim 1, further comprising:
   receiving, by the computing device and from the second device, a request for a connection to the first device;
   initiating, by the computing device, an attempt to establish a communication session between the second device and the first device; and
   responsive to determining that the attempt failed, initiating, by the computing device, a communication session between the second device and the voicemail server.

3. The method of claim 1, further comprising:
   receiving, by the computing device, an indication from the second device that the second device is to remain in a hold state until the first device has retrieved the partial voicemail message.

4. The method of claim 1, wherein initiating the communication session between the first device and the voicemail server is performed prior to determining that the user of the second device is no longer leaving the voicemail message.

5. The method of claim 1,
   wherein facilitating initiation of the communication session between the first device and the second device comprises sending, by the computing device, to the first device, a communication request to connect the first device to the second device, the method further comprising:
   responsive to receiving, by the computing device and from the second device, an indication to accept the communication request, sending, by the computing device and to the voicemail server, a command to delete the voicemail message.

6. The method of claim 1, further comprising sending, by the computing device and to the first device, a message including the voicemail message, wherein the voicemail message is playable by the first device as a ring-back tone.

7. The method of claim 1, further comprising:
   receiving, by the computing device, a request from the second device to connect with the first device;

responsive to determining, by the computing device, that a timeout period has elapsed, initiating, by the computing device, a communication session between the second device and the voicemail server, wherein the request to connect with the second device is received from the first device during the communication session between the second device and the voicemail server; and responsive to receiving, from the first device, the request to connect with the second device, terminating, by the computing device, the communication session between the second device and the voicemail server.

8. A method comprising:

receiving, by a computing device and from a first device, a request to communicate with a second device;

responsive to determining, by the computing device, that a user of the second device is leaving a voicemail message for a user of the first device at the time the request is received:

transmitting, by the computing device and to the first device, a message that includes the voicemail message, wherein the voicemail message is playable by the first device as a ring-back tone;

receiving, by the computing device and from a voicemail server on which the voicemail message is being left, an indication that the first device retrieved the voicemail from the voicemail server; and responsive to determining, by the computing device and based on the indication, that the first device has retrieved the voicemail message, initiating, by the computing device, a communication session between the first device and the second device.

9. A computing device comprising:

a processor;

a transceiver; and a memory configured to store instructions that, when executed by the processor, cause the processor to:

receive, via the transceiver and from a first device, a request to connect with a second device;

responsive to determining, by the computing device, that a user of the second device is leaving a voicemail message for a user of the first device at the time the request is received:

facilitate retrieval of the voicemail message by the first device from a voicemail server on which the voicemail message is being left by at least initiating a communication session between the first device and a voicemail server, wherein the user of the second device has not completed leaving the voicemail message such that the voicemail message available at the voicemail server is a partial voicemail message;

receive, via the transceiver and from the voicemail server, an indication that the first device retrieved the partial voicemail message from the voicemail server; and responsive to determining, based on the indication, that the first device has retrieved the partial voicemail message, facilitate initiation of a communication session between the first device and the second device.

10. The computing device of claim 9, wherein the instructions further cause the processor to:

receive, via the transceiver and from the second device, a request for a connection to the first device;

initiate an attempt to establish a communication session between the second device and the first device; and responsive to determining that the attempt failed, initiate a communication session between the second device and the voicemail server.

11. The computing device of claim 9, wherein the instructions further cause the processor to:

receive an indication from the second device that the second device is to remain in a hold state until the first device has retrieved the partial voicemail message.

12. The computing device of claim 9, wherein the instructions further cause the processor to initiate the communication session between the first device and the voicemail server prior to determining that the user of the second device is no longer leaving the voicemail message.

13. The computing device of claim 9, wherein the instructions further cause the processor to:

send, via the transceiver and to the first device, a communication request to connect the first device to the second device; and responsive to receiving, and from the second device, an indication to accept the communication request, send, via the transceiver and to the voicemail server, a command to delete the voicemail message.

14. The computing device of claim 9, wherein the instructions further cause the computing device to send, via the transceiver and to the first device, a message including the voicemail message, wherein the voicemail message is playable by the first device as a ring-back tone.

15. The computing device of claim 9, wherein the instructions further cause the processor to:

receive, via the transceiver, a request from the second device to connect with the first device;

responsive to determining that a timeout period has elapsed, initiate a communication session between the second device and the voicemail server, wherein the request to connect with the second device is received from the first device during the communication session between the second device and the voicemail server; and responsive to receiving, from the first device, the request to connect with the second device, terminate the communication session between the second device and the voicemail server.

* * * * *